United States Patent [19]

Hughes

[11] Patent Number: 5,678,615
[45] Date of Patent: Oct. 21, 1997

[54] FILLER FOR INACCESSIBLE BATTERIES

[76] Inventor: Gary L. Hughes, 16 Champions Blvd. Cir., Houston, Tex. 77069

[21] Appl. No.: 584,448

[22] Filed: Jan. 11, 1996

[51] Int. Cl.⁶ .................................................. B65B 3/00
[52] U.S. Cl. ................. 141/209; 141/59; 141/198; 141/290
[58] Field of Search ................. 141/40, 59, 198, 141/206, 209, 212, 213, 216, 229, 290–292, 351–354, 357

[56] References Cited

U.S. PATENT DOCUMENTS

| | | | |
|---|---|---|---|
| 2,006,393 | 7/1935 | Hapgood | 141/59 X |
| 2,028,097 | 1/1936 | Zafuta | 141/290 |
| 2,623,513 | 12/1952 | Robertson | 141/59 X |
| 2,784,748 | 3/1957 | Eichenlaub | 141/59 X |
| 2,822,831 | 2/1958 | Williams | 141/209 |
| 3,207,190 | 9/1965 | Silbereis et al. | 141/198 |
| 3,318,345 | 5/1967 | Beall, Jr. | 141/59 |
| 3,540,402 | 11/1970 | Kocher | 141/198 |
| 4,159,726 | 7/1979 | Mette | 141/40 |
| 4,454,896 | 6/1984 | Barrett, Jr. et al. | 141/209 |
| 4,986,318 | 1/1991 | Yun | 141/40 X |
| 5,002,100 | 3/1991 | Frederick | 141/198 X |
| 5,413,153 | 5/1995 | Zwilling et al. | 141/40 X |

FOREIGN PATENT DOCUMENTS 1-182294  7/1989  Japan .................... 141/290

Primary Examiner—J. Casimer Jacyna
Attorney, Agent, or Firm—Bush, Riddle & Jackson

[57] ABSTRACT

A filler system to add water to a specified level in a cell of a storage battery mounted in a relatively inaccessible location includes a container for fill water connected by an elongated, flexible supply line and an elongated flexible air vent line to a hand-held fill valve assembly. The fill valve assembly includes a normally closed, manually opening water valve connected to the supply line and a normally open buoyant air vent valve that closes to prevent the flow of air to the interior of the container when the liquid level in the cell rises to its proper level.

13 Claims, 2 Drawing Sheets

FILLER FOR INACCESSIBLE BATTERIES

FIELD OF THE INVENTION

This invention relates generally to a new and improved assembly for adding the correct amount of water to a cell of a storage battery, and particularly to an assembly that is particularly useful when servicing a battery that is installed in a relatively inconvenient or inaccessible location.

BACKGROUND OF THE INVENTION

In many cases the battery that is used to start an internal combustion engine or similar machine is tied down and housed in a location where it is very difficult for the user to service the same by checking and adding water to the cells at periodic intervals. For example numerous hull designs of recreational boats have the battery mounted in a well near the transom at the stern, and underneath an upper portion of the hull. A small door or other opening provides the only access. The battery typically is mounted in a plastic box having a lid, and a hold-down belt passes underneath floor loops and over the top of the lid where a buckle is used to hold the strap tight. Of course the battery needs to be checked periodically to determine if evaporation or boiling under charge has lowered the liquid level in any cell to a point where make-up is necessary.

To add make-up water to a battery cell, the vent cap is removed, and typically a supply is positioned over the same for gravity flow. Sometimes the water is merely poured in from a jug, or a bottle or the like, which requires visibility down into the cell to know if water is needed, and when filling has been accomplished to a desired level. If overfill occurs, an acid-water combination can be spilled onto adjacent surfaces which is highly corrosive. Where a battery is mounted in a well as described above, this procedure is not possible for apparent reasons. Jugs are known that have an automatic fill valve assembly on the spout thereof which is inserted into a battery cell opening to allow gravity flow until a certain level is attained. Hereagain a large vertical clearance is necessary on account on the size of the jug and its spout, so that use in connection with a battery located in a boat well is not possible as a practical matter.

Thus the only alternative in servicing a relatively inaccessible battery with make-up water is to remove it and its case from the well and onto the deck, which may require disconnecting both battery cables and the hold-down strap. In any event, removal is such a time consuming and inconvenient practice that many users do not bother to check the battery, and allow it to loose its charge and capacity to deliver rated current prematurely.

A general object of the present invention is to provide a new and improved battery service assembly that allows adding water to each cell, if needed, to the selected level without removing the battery from an otherwise inconvenient and relatively inaccessible location.

SUMMARY OF THE INVENTION

This and other objects are attained in accordance with the concepts of the present invention through the provision of a battery cell fill-up assembly that includes a water supply container that is communicated by a pair of flexible tubes to a fill valve assembly having a lower portion that is inserted a limited distance into the top of a cell after the cap has been removed. The fill valve assembly, which is hand held, includes a normally-closed, manually actuated water valve having a plunger that moves the valve to open position when pressure is applied to the upper end thereof. When the water valve is open, water flows via one flexible robe through the valve and into the cell. The water valve assembly further includes a buoyant air vent valve on the lower end of the plunger that floats up and closes an air vent passage when the water has risen to the proper level in the cell. When the vent valve closes so that air can no longer pass through the vent robe, flow of water from the container stops almost immediately due to formation of a negative pressure above the water level in the container. A check valve in the container cap prevents water from flowing into the air vent tube. With the present invention, a battery in a remote and inconvenient location can be serviced because of the flexible tubes and the feature of automatic termination of the water flow at the correct fill level by operation of the air vent valve. Very little vertical clearance is required for the user to reach into a compartment, remove a cell cap, and insert the water and air vent valve assembly while the container remains outside the compartment.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which.

DETAILED DESCRIPTION OF A PREFERRED EMBODIMENT

Figure 1:
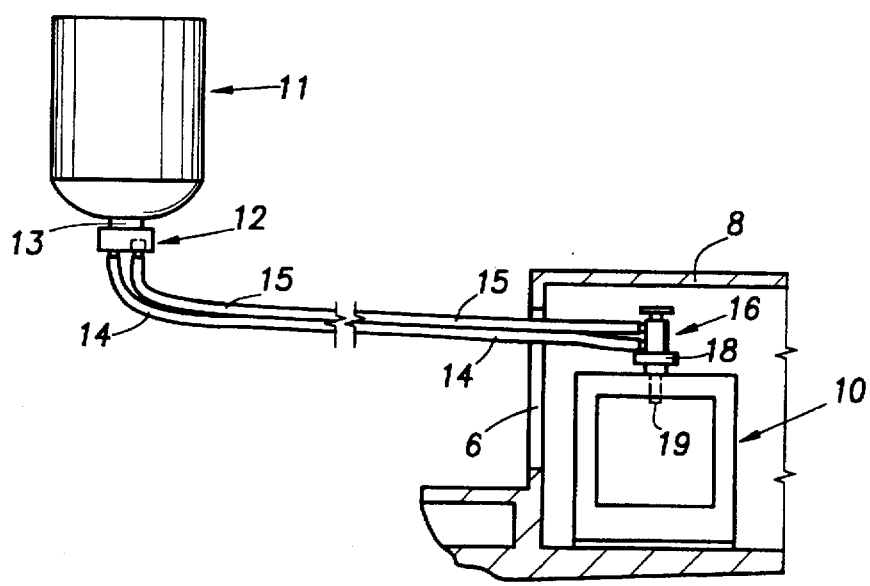
FIG. 1 is a schematic view of the invention being used to service a wet cell battery with water.

Referring initially to FIG. 1, a system to automatically fill to a proper level each cell of a storage battery 10 includes a container 11 made of plastic or the like which is at least partly filled with distilled water. The container 11 has a cap 12 threaded onto its outlet neck 13, and when inverted as shown the water tends to flow there from under gravity. A pair of flexible lines or tubes 14, 15 extend from tubular fittings on the cap 12 to similar fittings on a fill and vent valve assembly 16. The tubes 14, 15, which can be several feet long, can be joined as an umbilical, or can be separate and strapped together by ties. As will he described below, the fill valve assembly 16 has a plunger that telescopes inside a tubular body and which is arranged to be opened by manual pressure and to close when the pressure is released. A flange member 18 limits downward movement as the reduced diameter lower portion 19 of the plunger is inserted into a top opening 9 of a cell of the battery 10. As shown, the battery 10 is mounted in a relatively inaccessible compartment underneath the after-deck portion 8 of a boat, for example. Numerous other inaccessible and/or inconvenient battery locations can be envisioned and often are encountered. The battery 10 typically is stored in a plastic box that is strapped down to prevent movement, and can be placed and secured only through a small opening 6 in a vertical portion of the hull which may be closed by a door or curtain. There is little vertical space above the battery 10, so that it is normally impossible to even view the water level in each cell to determine if servicing is needed, much less pour water from an open container into a cell that is low. Usually the battery must be horsed out through the opening 6 and into the deck floor.

Figure 2:
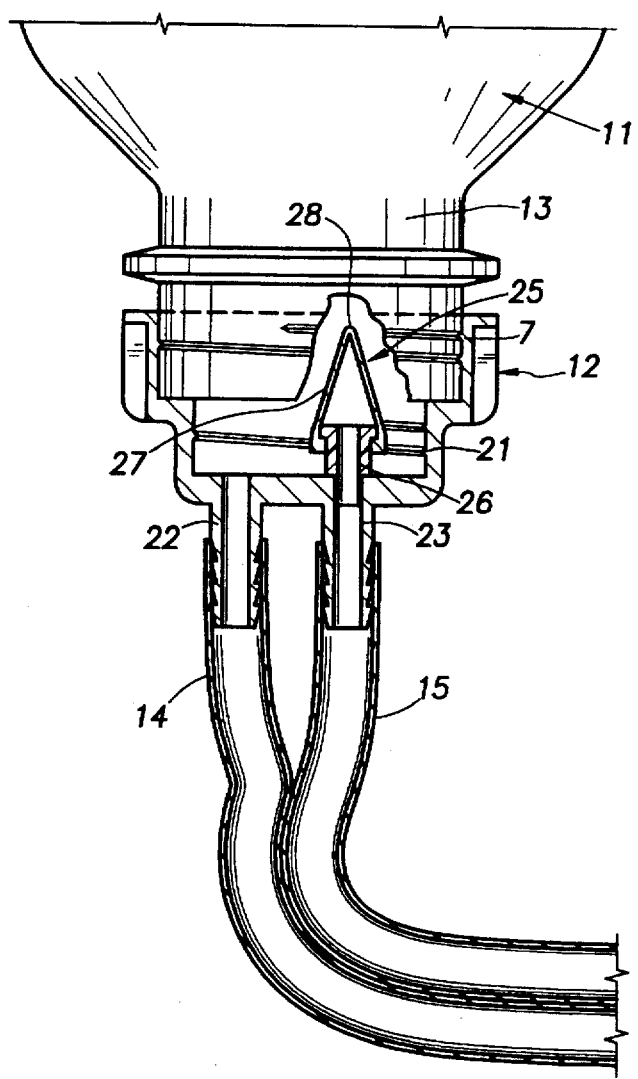
FIG. 2 is an enlarged, cross-sectional view of the water supply portion of the invention.

Referring now to FIG. 2, the filler assembly for servicing the battery 10 includes the container 11 and its cap 12 which is threaded at 7 onto the neck 13 thereof. Preferably the cap 12 also has additional, lesser diameter threads 21 that can be screwed onto companion threads of another container having a smaller neck to provide versatility. The cap 12 is provided with a pair of integral connector nipples 22, 23 that are formed with external flutes that grip the end portions of the respective flexible lines 14, 15 which are force-fitted thereon. An air vent check valve 25 having a base 26 and an elastomer valve element 27 is fixed inside the cap 12 in alignment and communication with the nipple 23. The valve element 27 has opposed petals that define a normally closed slit 28 which opens in response to a predominate pressure below it, and which closes by resilience when the pressures above and below are equal.

Figure 3:
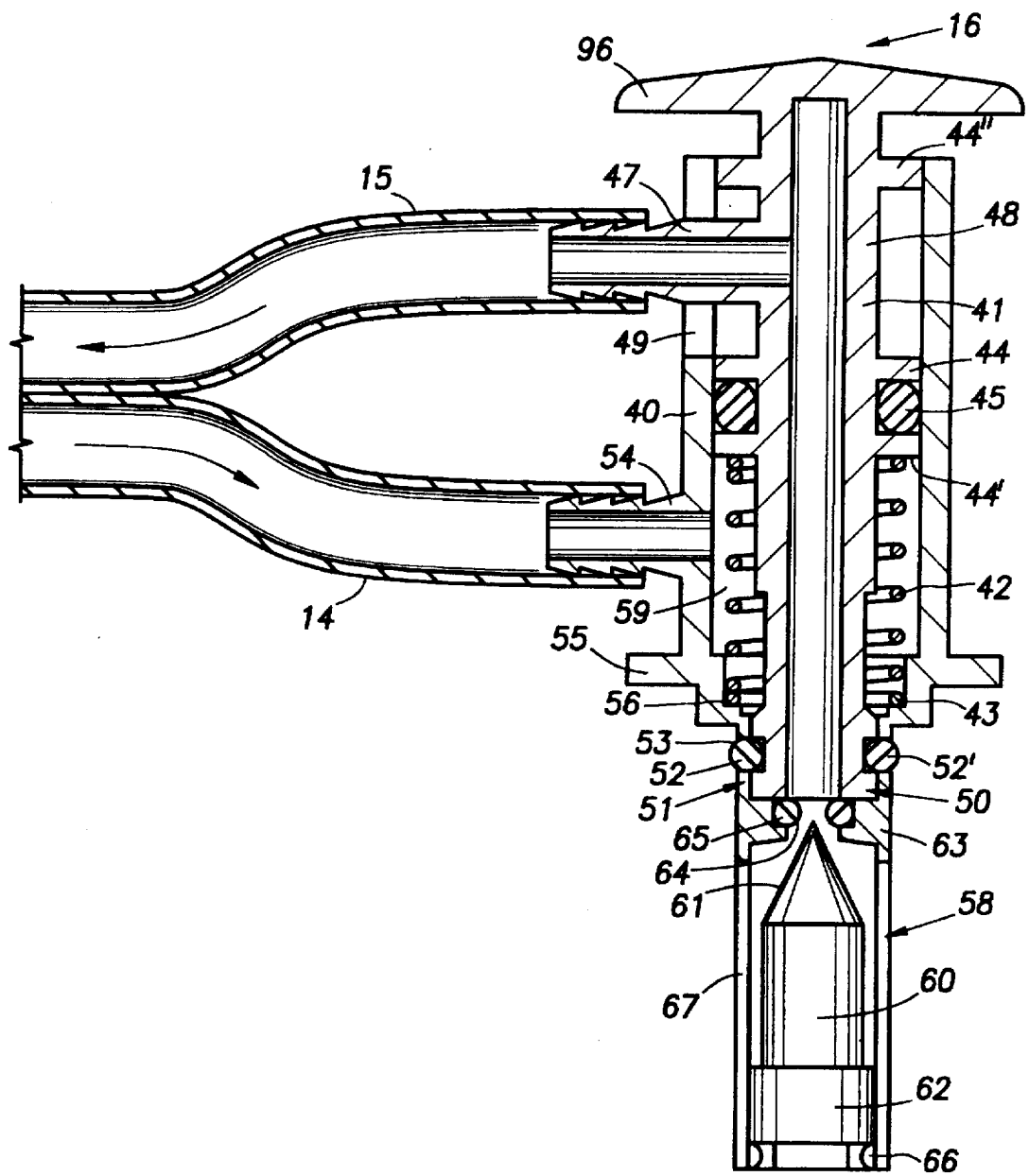
FIG. 3 is a view similar to FIG. 2 of the fill and vent valve structure used at the battery.

The flexible line 15 conveys vent air toward the container 11, and the other flexible line 14 conveys water from the interior of the container toward the fill valve assembly 16 which is shown in detail in FIG. 3B. The assembly 16 includes a generally tubular body 40 having an internal bore that receives a plunger 41 which is biased upward by a coil spring 42. The spring 42 reacts between an internal shoulder 43 and the lower face 44 of guide flange 44 on the plunger 41. The flange 44 carries a seal ring 45 that prevents leakage of water upwardly therepast. A plate or disc 46 on the upper end of the plunger 41 allows downward pressure to be applied manually by the thumb or fingers of the user to advance the plunger downward. When such pressure is released, the spring 42 returns the plunger to its upper position. An upper flange 44' serves as a centralizer for the upper end of the plunger 41 to stabilize it during movement.

An air outlet nipple 47 which communicates with the bore 48 of the plunger 41 extends outward through an elongated slot 49 in the wall of the body 40. The outer end portion of the air vent line 15 is connected to the nipple 47 as shown. The lower end portion 50 of the plunger 41 has an enlarged diameter to form a valve head 51 that carries a seal ring 52 in a groove 52'. The seal ring 52 engages a downwardly facing seat surface 53 on the body 40 when the plunger is in its upper position. Another nipple or tube 54 on the body 40 communicates with the internal bore 59 of the body below the guide flange 44, and is connected to the outer end portion of the water supply line 14. When the plunger 41 is forced downward against the bias of the spring 42, the seal ring 52 disengages from the seat surface 53 and allows water from the container 11 to flow downward therepast by gravity feed and into a cell of the battery 10. An outwardly directed flange 55 on the body 40 define flange member 18 and is arranged to rest against the top surface of a battery cell opening after its vented closure cap has been removed. The lowermost portion 56 of the body 40 preferably is sized to fit with modest clearance into the bore of such cell opening in order to approximately center the body 40 with respect thereto.

A cage 58 is secured to the valve head 51 and moves vertically therewith. A float valve element 60 having a conical upper end surface 61 is mounted for limited vertical movement on the cage 58, and has an annular guide flange 62 to maintain the valve element centered therein. The cage 58 has an inwardly directed annular shoulder 63 which defines a central bore 64 and carries a seal ring 65 on the wall thereof. Inward projections 66 at the bottom of the cage 58 limit downward movement of the valve element 60, and a plurality of circumferentially spaced, longitudinal slots 67 can be formed in the cage to provide ample vent air flow area. As mentioned, the valve element 60 has positive buoyancy and will float upward as the liquid level in the battery cell rises. So long as the float valve surface 61 remains spaced from the seal ring 65, air is vented through the bore 48 of the plunger 40, and flows through the vent line 15 and into the container 11 via the check valve 25 so that water can flow through the line 14 and into the body bore 59 below the flange 44. However, when the float valve 60 moves up and closes against the seal ring 65, air can no longer vent into the container 11, and water flow stops immediately due to the negative pressure condition that develops in the container in the region above the water therein.

OPERATION

In operation and use of the present invention, it is relative easy to top up a cell of a battery 10 with water, no matter how inaccessible the battery location may be. The user reaches in and removes the cell cap, and then inserts the cage 58 down into the opening until the flange 55 rests against the top of the opening. The container 11 is inverted to induce gravity feed of water through the line 14, and then the plunger 40 is pressed downward by pushing on the plate 46 to move the valve head 50 away from the seat 53 and open the water flow valve. If the water level in the cell is not low, the float valve 60 will have been raised on account of its buoyancy into engagement with the seal ring 65 so that air can not vent via the bore 48, the line 15 and the check valve 25 into the region above the water in the container 11. This will be confirmed by the fact that no air bubbles rise through the water in the container, and that none are heard breaking the water's upper surface.

To close the fill valve, the pressure is released on the plunger 40 to allow the coil spring 42 to raise the plunger and thereby engage the seal ring 52 with the seat surface 53. Then the cage 58 is withdrawn from the cell opening, and the cell vent cap replaced. If the liquid level is low in any cell of the battery 10, the float valve 60 remains in a lower open position when the stop flange 55 engages the top of the cell opening. Then when the plunger 41 is depressed, air is vented via the bores 64, 48, the line 15, and the check valve 25 into the region above the water level in the container 11 to dissipate the negative pressure so that water can flow by gravity feed through the line 14 and past the valve head 50 into the battery cell. As the liquid level builds up, eventually the float valve 60 will be buoyed up until its conical upper surface 61 engages the seal ring 65 to prevent further induction of air into the line 15. A sufficient negative pressure immediately develops in the region of the container 11 above the water therein to stop further flow of water via the supply line 14. Then the pressure on the plunger 41 is released so that the return spring 42 closes the water valve seal 52 against the seat 53. The spacing of the stop flange 55 with respect to the seat 53 is selected such that the added water brings the liquid level in the cell to precisely that which is recommended by the manufacturer of the battery.

All cells, whether six on a 12 volt battery or three on a 6 volt battery and so forth, are serviced with water added as needed. The present invention makes such servicing very convenient no matter how inaccessible the location of the battery 10 may be. Of course the system can be used to fill each cell with a fresh acid-water charge. Preferably the container 11, the cap 12, the lines 14, 15 and the valve assembly 16 are made of suitable plastic materials that do not corrode in the presence of moisture or battery acids.

It now will be recognized that a new and improved servicing system for batteries mounted in inaccessible locations has been disclosed. Of course although the invention is particularly arranged for servicing relatively inaccessible batteries, it also can be used to service a battery where access is not a particular problem. The container 11 can be supplied by the user since it is a standard, readily available item. Since certain changes and modifications may be made in the disclosed embodiment without departing from the inventive concepts involved, it is the aim of the appended claims to cover all such changes and modifications falling within the true spirit and scope of the present invention.

What is claimed is:

1. A system for supplying a liquid to a cell of a battery in order to fill said cell to a selected level, comprising: closure means adapted to communicate a flexible liquid supply line and a flexible air vent line to a container having a liquid therein; and a valve assembly including a body, a normally closed liquid valve means in communication with said supply line, and a plunger in said body for manually opening said valve means to admit liquid into said cell, said valve assembly further including a normally open air vent valve means on said plunger in communication with said air vent line for closing off said air vent line in response to rising liquid level in said cell to automatically stop the flow of liquid from the container when said level reaches a selected elevation; and a fluid passage between said plunger and said body leading to said liquid valve means, said passage being in fluid communication with said liquid supply line to permit the supply of liquid to said cell when the liquid level in said cell is below the selected elevation and said air vent line is open.

2. The system of claim 1 further including resilient means for biasing said plunger in a direction to close said liquid valve means.

3. The system of claim 1 wherein said plunger has a bore leading to said vent valve means, said bore being in communication with said air vent line.

4. The system of claim 1 further including check valve means for enabling air to enter the container from said air vent line while preventing liquid in the container from entering said air vent line.

5. The system of claim 1 wherein said air vent valve means includes a buoyant valve element that floats upward with rising liquid level in said cell until said valve element reaches closed position.

6. A system for supplying a liquid to a cell of a battery in order to fill said cell to a selected level, comprising: a container having liquid therein and adapted to be inverted so that said liquid tends to flow therefrom by gravity, said container having a neck and a cap on said neck; a pair of elongated, flexible tubes having inner and outer end portions; means for connecting said inner end portions of said tubes to the interior of said cap and said container; check valve means for preventing the flow of liquid into one of said tubes while allowing the flow of air from said one tube into said container; a fill valve assembly including a tubular body having a plunger mounted for longitudinal movement therein, said plunger having a bore; valve means on said plunger and body adapted to be opened when said plunger is moved in one direction relative to said body and closed when said plunger is moved in another direction relative to said body; resilient means for moving said plunger in said other direction, said plunger being adapted to be moved manually in said one direction; means for connecting said outer end of the other of said flexible tubes to the interior of said body so that liquid can flow past said valve means when opened; a cage on said plunger; vent valve means in said cage having positive buoyancy and arranged to float upward from an open position to a closed position in engagement with a seat in response to rising liquid level in said cell, said vent valve means when open permitting air to pass into the bore of said plunger to said outer end portion of said one tube so that said air can vent via said one tube and said check valve means into the interior of said container and release negative pressure above the liquid in said container and allow liquid to flow therefrom into said other tube only so long as said vent valve means is open.

7. The system of claim 6 wherein said plunger has a lesser outer diameter than the bore of said body to provide an annular water flow passage therebetween, and further including an outwardly directed flange on said plunger defining the upper end of said passage and sealingly engaging said bore of said body.

8. The system of claim 7 further including a plate on the upper end of said plunger to which manual pressure is applied to shift said plunger to open position, and means spaced from said flange for centralizing said plunger in said bore of said body.

9. The system of claim 8 wherein said vent valve means has a conical valve surface that engages said seat in the closed position thereof.

10. A liquid supply system for supplying a liquid at a selected liquid level; said system comprising;

a battery having a cell for filling with the liquid; closure means adapted to communicate a flexible liquid supply line and a flexible air vent line to a container having a liquid supply therein; and a valve assembly arranged for insertion within said battery cell; said valve assembly including a body, a normally closed liquid valve means in communication with said supply line, and a plunger in said body for manually opening said valve means to admit liquid into said cell, said valve assembly further including a normally open air vent valve means on said plunger in communication with said air vent line for closing off said air vent line in response to rising liquid level in said cell to automatically stop the flow of liquid from the container when said level in said cell reaches a selected elevation.

11. The system of claim 10 further including a fluid passage between said plunger and said body leading to said liquid valve means, said passage being in communication with said liquid supply line.

12. The system of claim 10 further including check valve means for enabling air to enter the container from said air vent while preventing liquid in the container from entering said air vent line.

13. The system of claim 10 wherein said air vent valve means includes a buoyant valve element that floats upward with rising liquid level in said cell until said valve element reaches closed position.

* * * * *